UNITED STATES PATENT OFFICE.

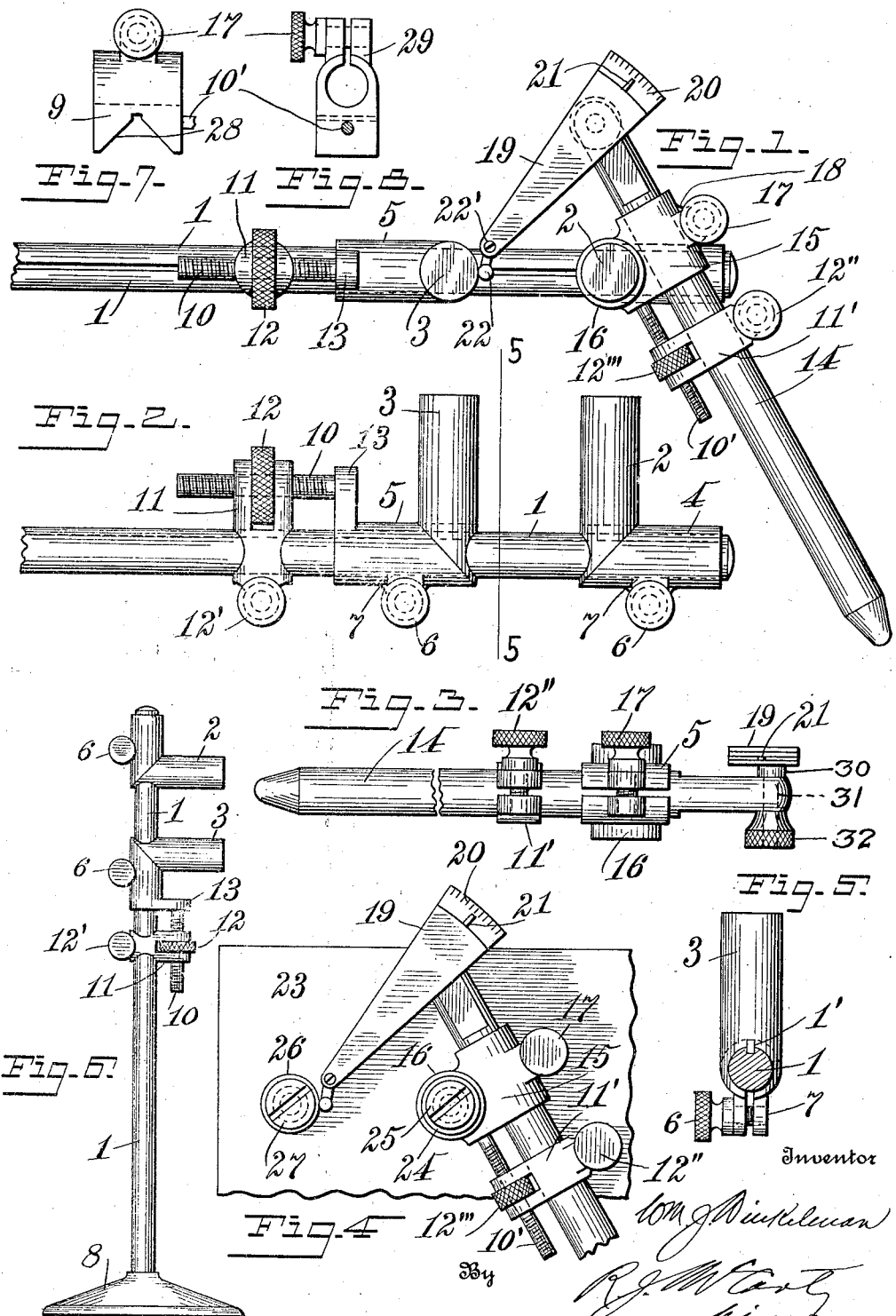

WILLIAM J. WINKELMAN, OF DAYTON, OHIO.

MEANS FOR ACCURATELY LOCATING THE POSITIONS OF HOLES TO BE BORED.

1,330,225.

Specification of Letters Patent. Patented Feb. 10, 1920.

Application filed July 21, 1919. Serial No. 312,195.

*To all whom it may concern:*

Be it known that I, WILLIAM J. WINKELMAN, a citizen of the United States, residing at Dayton, in the county of Montgomery and State of Ohio, have invented certain new and useful Improvements in Means for Accurately Locating the Positions of Holes to be Bored, of which the following is a specification.

This invention relates to means for accurately locating the positions of holes to be bored in jigs, fixtures, etc., my means of an indicator in connection with an adjustable gage. The work is done by first obtaining the proper spread or length between the holes to be bored. This proper length or spread is first ascertained by the use of the well known Johanasen blocks in connection with the adjustable gage and indicator holder which forms the subject matter of my invention.

The object of the invention is to provide means for working closer than is possible with the micrometer or height gage or vernier now commonly in use.

Before entering into a more particular description of the invention a general reference is made to the accompanying drawings of which, Figure 1 is a top plan view of the combined gage and indicator holder with a portion of the main supporting shaft broken off to facilitate space for the necessary views.

Fig. 2 is a side elevation of the device.

Fig. 3 is a bottom view of the indicator holder or indicator supporting rod.

Fig. 4 is a plan view showing the device applied in actual use. The indicator and its supporting rod being removed from the position shown in Fig. 1 and applied to the jig or fixture in which the holes are to be bored.

Fig. 5 is a sectional view on the line 5—5 of Fig. 2, showing the adjustable post on the supporting shaft.

Fig. 6 is an elevation of the device, the main supporting shaft being mounted on a base.

Figs. 7 and 8 are side and end views, respectively, of a modified form of swivel member.

In a more particular description of the invention similar reference characters indicate corresponding parts in the several views of the drawings.

The shaft —1— constitutes a main element or supporting member. —2— and —3— designate posts slidably mounted on said shaft and the latter of which is adjustable along the said shaft. The said posts —2— and —3— have sleeve portions —4— and —5— which receive the shaft —1— and by means of which the said posts are secured in their proper positions. The said sleeves are fitted with adjusting knurled screws —6— which penetrate ears —7—. The said shaft —1— has a longitudinal keyway which receives a key —1'— which maintains the posts —2— and —3— in permanent alined positions. In Fig. 6 the supporting shaft —1— is shown as mounted on a base —8— in connection with which it may be used when desired, for example, when a height gage is used for locating the spread or distance of the holes to be bored. The post —2— may be permanently fixed to the shaft —1— but it is preferable to have it movable on account of manufacturing requirements or in case a longer shaft —1— should be desired where a wider range of spreads or holes is necessary. The post —3— is essentially slidable on the supporting shaft —1— and is secured thereto by a similar clamp screw —7— when the desired spread is ascertained. In ascertaining the spread or distance from center to center of the posts in a given case, the well known Johanasen blocks are slid between the posts —2— and —3—. Or in the case of the use of the height gage with the indicator and Johanasen blocks where the shaft —1— is mounted on the base —8— as shown in Fig. 6. The post —3— is adjusted longitudinally on the shaft by means of an adjusting screw —10— which is supported on a clamp member —11— which in turn is held on the shaft —1— by a clamp screw —12'— by means of which it is adjusted. The adjusting screw —10— has a knurled nut —12— by which it is turned with the fingers. The end of the said screw engages a projection —13— on the sleeve —5— of the post —3—. —14— designates the indicator holder or rod. This element is supported on the shaft —1— by a swivel connection with the post —2—. This connection comprises a clamp —15— which receives the rod —14—, and barrel portion —16— that receives the post —2— and has a snug sliding fit thereon. The said clamp —15— is held on the rod —14— by a clamping screw —17— which penetrates ears —18—. An indicator or member —19— having graduations —20— thereon reading in thousands, is adjustably supported on an end of the rod —14—. The connection is shown in Fig. 3, where —30— indicates a boss on the indicator —19— from which extends a screw —31— through rod —14— and receives a thumb nut 32—. Any type of indicator may be used that is suitable for the purposes of the device.

As shown in the drawings the indicator has a swinging movement past the center of the post —3—. The said indicator as shown is set at zero which is made manifest by the position of the pointer —21—. The end of the indicator opposite the graduations —20— has a round member or ball —22— which is connected to the end of the pointer —21— by an intervening pivot —22'—. This ball member contacts with the post —3—. When the said ball makes such contacts with the post at high center point as shown in Fig. 1, and the barrel —16— is on the post —2— and the pointer —21— points to zero on the graduations —20— as is shown in Fig. 1, the device is ready for use which is done by transferring the indicator consisting of the indicator proper and the rod —14— and the other parts thereon.

As is shown in Fig. 4, —23— represents a part of a jig or fixture to be set up for boring. A button —24— is placed on the said jig or fixture in the proper place and is secured by a screw —25— which penetrates it. The barrel —16— having been removed from the position shown in Fig. 1, with the indicator devices, is placed over the button —24—. A button —26— is likewise placed on the jig or fixture —23— and is drawn down and made tight by a screw —27— to be tapped around. The indicator —19— is then swung on the button —24— until it engages the button —26— which is being tapped around the point indicated, for example, zero. In the drawings the device is illustrated in connection with the button scheme for locating holes with precision, as it is commonly called. The tool may, however, be used in connection with other methods, such for example, as employ plugs or studs, and where buttons are not used.

In this use the device is employed in the same way for ascertaining the proper spread or location of holes to be bored.

In Fig. 7. the swivel member —9— forming the connection between the indicator rod —14— and the main shaft —1— is modified by forming it with tapered sides —28— which engage the post —2— and subsequently engage the button —24—. The surfaces —28— take the place of the barrel —16— shown in Fig. 1. The indicator is adjusted by moving the rod —14— longitudinally. At such time the clamping screw —17— is loosened to permit of the movement of the rod through the clamp —15—, and the clamping screw —12"— is tightened to bind clamp —11'— to said rod. The rod is adjusted or moved by turning screw —10'— through the movement of the nut —12'''—. After this is done the screw —17— is tightened to bind clamp —15— to the rod —14—.

The form of swivel connection —9— shown in Figs. 7 and 8 is suitable for use when the holes to be bored in a given article are too close together to permit of the use of the barrel —16—. The said swivel connection has a split projection —29— which receives the clamping screw —17—, and is swung on the back side of the post —2—. The result, when this form of device is used for the connection between the transfer caliper as a whole, and the gage, the same result is secured as when the barrel —16— is employed.

Having described my invention, I claim:

1. In a device of the character specified, a main supporting shaft having posts projected therefrom and constituting a gage for initially determining the positions of holes to be bored in a given article, means for varying the dimensions between said posts, in combination with a transfer caliper pivotally connected to one of said posts and adapted to indicate the dimensions between said posts, said caliper being removable from its pivotal connection with said post.

2. In a device of the character specified, a gage device by means of which the positions of holes to be bored in a given article are ascertained, in combination with a transfer caliper operatively connected with said gage device and detachable therefrom and adapted to indicate the dimensions determined by the gage device, and means adapted to be used in connection with said caliper in transferring said dimensions to said article whereby the positions of the holes to be bored in said article may be located thereon.

3. In a device of the character specified, a gage device comprising a main shaft, posts extended therefrom, and means for varying the dimensions between said posts, in combination with a transfer caliper including a calibrated member adapted to make contact with one of said posts, said caliper having a pivotal connection with the other one of said posts and adapted to be detached from said pivotal connection when the measurements are taken from the gage, and means corresponding to the posts mounted on the work whereby the distance between the posts of the gage is transferred to the work.

4. In a device of the character specified, a gage for obtaining the positions for holes to be bored in a given article, and comprising a main supporting shaft, posts projected therefrom, means for adjusting one of said posts relative to the other to vary the dimensions between said posts, whereby the positions of the holes to be bored in said article may be accurately ascertained, in combination with a transfer caliper adapted to transfer said dimensions to said article, said transfer caliper having a detachable swivel connection with one of the posts, and a calibrated member adapted to engage the other of said posts and to indicate the dimensions between the posts, and means coöperating with said caliper in transferring the said dimensions to the said article.

5. In a device of the character specified, a gage comprising a supporting shaft, posts projected therefrom, means for adjusting the positions of one of said posts relative to the other, in combination with a transfer caliper comprising a rod having a detachable pivotal connection with one of said posts, a calibrated arm supported on said rod, and an indicator or pointer adapted to engage the adjustable post and to indicate the dimensions between the said posts, and means coöperating with the said caliper for effecting a transfer of said dimensions to the article to be worked upon.

In testimony whereof I affix my signature.

WILLIAM J. WINKELMAN.